(12) United States Patent
Neugebauer (10) Patent No.: US 7,405,740 B1
(45) Date of Patent: Jul. 29, 2008

(54) CONTEXT SENSITIVE SCALING DEVICE AND METHOD

(75) Inventor: Charles F. Neugebauer, Palo Alto, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1404 days.

(21) Appl. No.: 09/536,880

(22) Filed: Mar. 27, 2000

(51) Int. Cl.
*G09G 5/391* (2006.01)
*G06T 3/40* (2006.01)

(52) U.S. Cl. ........................................ 345/667; 345/698

(58) Field of Classification Search ................. 345/667, 345/668, 670, 671, 698; 382/298, 299, 300, 382/261; 348/610; 358/3.24
See application file for complete search history.

(56) References Cited

U.S. PATENT DOCUMENTS

| | | | | |
|---|---|---|---|---|
| 5,131,057 | A * | 7/1992 | Walowit et al. | 382/261 |
| 5,327,257 | A * | 7/1994 | Hrytzak et al. | 358/447 |
| 5,602,934 | A * | 2/1997 | Li et al. | 382/128 |
| 5,739,867 | A | 4/1998 | Eglit | |
| 5,774,601 | A * | 6/1998 | Mahmoodi | 382/298 |
| 6,044,178 | A * | 3/2000 | Lin | 382/261 |
| 6,088,489 | A * | 7/2000 | Miyake | 382/299 |
| 6,603,888 | B1 * | 8/2003 | Kikuchi et al. | 382/300 |
| 6,665,448 | B1 * | 12/2003 | Maurer | 382/261 |
| 6,697,534 | B1 * | 2/2004 | Tan et al. | 382/261 |
| 7,054,507 | B1 * | 5/2006 | Bradley et al. | 382/300 |

OTHER PUBLICATIONS

J.V. Stone and S. D. Isard, Adaptive Scale Filtering A General Method for Obtaining Shape from Texture, Jul. 1995, IEEE Transactions on Pattern Analysis and Machine Intelligence, pp. 713-718.*
R. Crane, "A Simplified Approach to Image Processing," Prentice Hall, New Jersey (1997), Chapter 4, pp. 110-129.

* cited by examiner

*Primary Examiner*—Jeffery A. Brier
(74) *Attorney, Agent, or Firm*—Lisa K. Jorgenson; Stephen Bongini (57) ABSTRACT

A method is provided for scaling a source image to produce a destination image. According to the method, a local context metric is calculated from a local portion of the source image. A convolution kernel is generated from a plurality of available convolution kernels based on the calculated local context metric, and the generated convolution kernel is used to generate at least one pixel in the destination image. Also provided is an image scaling device that receives pixels of a source image and outputs pixels of a scaled destination image. The image scaling device includes a context sensor, a kernel generator, and a scaler. The context sensor calculates a local context metric based on local source image pixels, and the kernel generator generates a current convolution kernel from a plurality of available convolution kernels based on the local context metric calculated by the context sensor. The scaler receives the coefficients of the current convolution kernel from the kernel generator, and uses the coefficients to generate at least one pixel of the destination image from pixels of the source image. Additionally, a display device that includes such an image scaling engine is provided.

24 Claims, 4 Drawing Sheets

CONTEXT SENSITIVE SCALING DEVICE AND METHOD

BACKGROUND OF THE INVENTION

1. Field of the Invention

The present invention relates to digital signal processing, and more specifically to a method and device for scaling an image from one resolution to another.

2. Description of Related Art

Image scaling resizes a source image having one resolution to produce a destination image having another resolution. In general, the source image is scaled by using a discrete geometric transform to map the pixels of the destination image to pixels of the source image. The destination image is traversed and a transformation function is used to calculate which pixels in the source image are to be used to generate each destination pixel. Because destination pixels are not typically aligned with the source pixels, an interpolation function is used to generate a value for a destination pixel by weighting the surrounding source pixels. Several common interpolation functions can be used based on the specific application. While the more sophisticated interpolation algorithms generate higher quality images, their complexity requires more processing time or hardware to generate the destination image.

Nearest neighbor interpolation is a simple algorithm in which fractional destination pixel locations are simply rounded so as to assign the closest source pixel to the destination image. While this algorithm is fast, the destination image quality can be poor and appear jagged. Bilinear interpolation produces higher quality images by weighting the values of the four pixels nearest a fractional destination pixel location. Each weight is inversely proportional to the distance of the corresponding source pixel from the fractional destination pixel location. Bilinear interpolation produces a smoother destination image, but requires more processing time because three linear interpolations must be computed for each of the destination pixels.

Figure 1A:
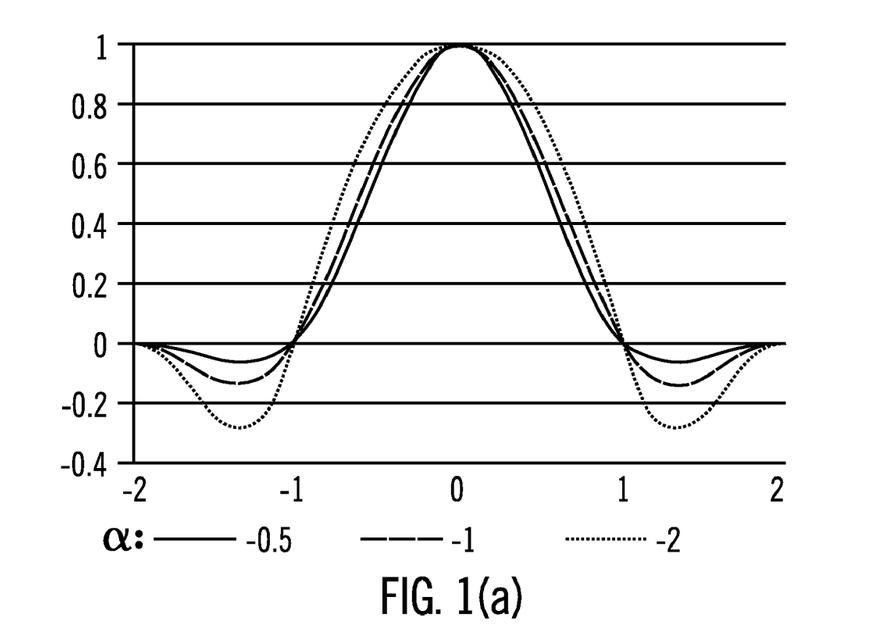
FIGS. 1(a) and 1(b) are graphs showing conventional interpolation functions used in image scaling.

While the nearest neighbor algorithm uses one source pixel and the bilinear algorithm uses four source pixels to generate each destination pixel, higher order interpolation functions produce high quality images by using greater numbers of source pixels and more complex interpolation functions. The interpolation function is centered at a specific point of the source image and used to weight the nearby pixels. For example, the cubic convolution algorithm uses the sixteen nearest source pixels and the following one-dimensional cubic function, which is shown in FIG. 1(a), to calculate the value of each destination pixel.

$$f(x) = \begin{cases} (a+2)|x|^3 - (a+3)|x|^2 + 1 & 0 \le |x| < 1 \\ a|x|^3 - 5a|x|^2 + 8a|x| - 4a & 1 \le |x| < 2 \\ 0 & 2 \le |x| \end{cases}$$

where a is typically between −0.5 and −2.0. The destination pixel values must be clipped whenever the result is less than zero or greater than the maximum pixel value.

Figure 1B:
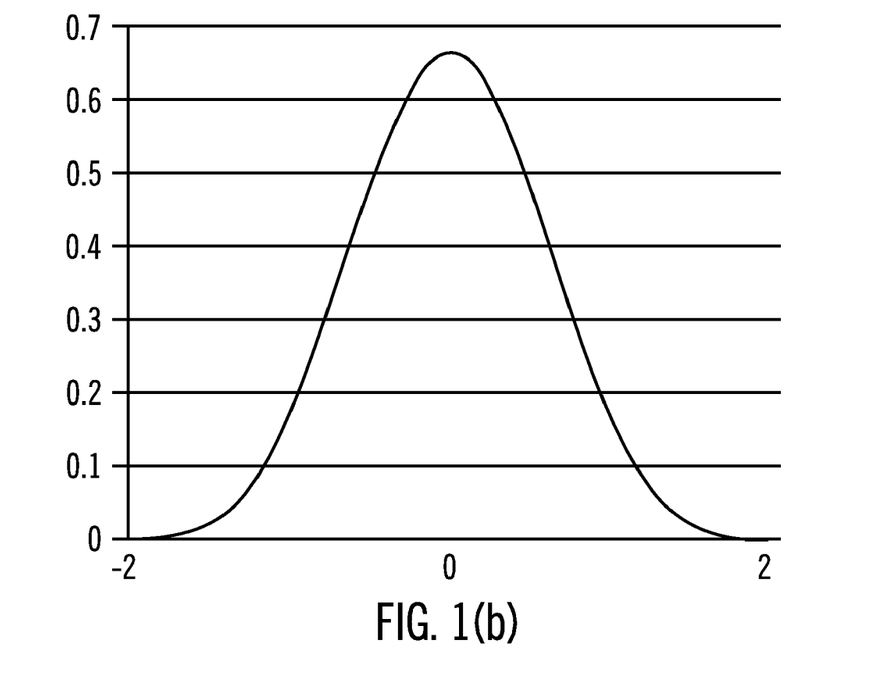

The cubic convolution function produces a sharpened image due to the presence of negative side lobe values. On the other hand, the B-spline algorithm produces a smoothed image using the sixteen nearest source pixels and the following one-dimensional B-spline function, which is shown in FIG. 1(b).

$$f(x) = \begin{cases} (1/2)|x|^3 - |x|^2 - (2/3) & 0 \le |x| < 1 \\ -(1/6)|x|^3 + |x|^2 - 2|x| + (4/3) & 1 \le |x| < 2 \\ 0 & 2 \le |x| \end{cases}$$

Clipping is not required when using the B-spline function because it is only positive and the sum of the sample points is always 1. A more detailed explanation of conventional scaling using linear transformation algorithms can be found in R. Crane, "A Simplified Approach to Image Processing," Prentice Hall, New Jersey (1997), which is herein incorporated by reference.

As explained above, conventional image scaling algorithms are based on the application of a linear kernel function that weights the contribution of source pixels to each destination pixel. The weights are chosen based on the location of the theoretical destination sampling point relative to the actual source pixels so as to combine the source pixels in a manner that best represents the source content at the resolution of the destination image. In the classic signal processing sense, the continuous analog input is decimated by the conversion to a digital image and an interpolation filter function is used to re-sample the signal. Mathematically, the operation is a two-dimensional linear convolution. More specifically, a two-dimensional scaling filter calculates a dot product of the source pixel values with a weighting vector that is computed using a predetermined filtering function.

Currently, the scaler engines used for image scaling in video graphics applications employ conventional linear transform algorithms (such as those described above) and are primarily differentiated by the size of the convolution kernel. The interpolation algorithm to be used in a specific engine is determined based on the competing considerations of output image quality and hardware costs. The hardware that is needed to practically implement an interpolation algorithm depends on factors such as the filter weight resolution and the number of filter taps, which are dependent on the convolution kernel used for the interpolation function.

For example, the simple filtering kernel used to implement the nearest neighbor algorithm is restricted to have only a single nonzero weight. Because no multiplication or addition is required, a simple structure can be used to perform convolution with this filter function. However, to achieve better image quality, non-binary weights must be used. This necessitates the use of multipliers to perform the convolution. Furthermore, video graphics scalar engines typically operate on raster scanned information in which horizontal lines of pixels are serially processed. If the interpolation algorithm requires information from a pixel in a line other than the current line, the video information must be delayed by a line buffer memory (e.g., RAM). Image quality generally improves with more filter taps.

While hardware costs can limit the choice to certain interpolation algorithms, the specific algorithm that is used by a scalar engine is preferably chosen based on the content presented by the application. For example, one algorithm may be optimal for one type of content such as live video, while another algorithm of similar complexity is optimal for another type of content such as computer graphics. Although the interpolation algorithm can be chosen based on the image content, conventional scalar engines use a single convolution kernel for scaling the entire image. Therefore, if different types of content are present in the image, the overall quality of the scaled image is suboptimal.

SUMMARY OF THE INVENTION

In view of these drawbacks, it is an object of the present invention to overcome the above-mentioned drawbacks and to provide a method for scaling an image in which the convolution kernel to be applied is selected based on local image content.

Another object of the present invention is to provide an image scaling device that selects which convolution kernel to apply based on local image content.

One embodiment of the present invention provides a method for scaling a source image to produce a destination image. According to the method, a local context metric is calculated from a local portion of the source image. A convolution kernel is generated from a plurality of available convolution kernels based on the calculated local context metric, and the generated convolution kernel is used to generate at least one pixel in the destination image. In a preferred method, these steps are repeated for each pixel in the destination image.

Another embodiment of the present invention provides an image scaling device that receives pixels of a source image and outputs pixels of a scaled destination image. The image scaling device includes a context sensor, a kernel generator that is coupled to the context sensor, and a scaler that is coupled to the kernel generator. The context sensor calculates a local context metric based on local source image pixels, and the kernel generator generates a current convolution kernel from a plurality of available convolution kernels based on the local context metric calculated by the context sensor. The scaler receives the coefficients of the current convolution kernel from the kernel generator, and uses the coefficients to generate at least one pixel of the destination image from pixels of the source image. In one preferred embodiment, the local context metric has more than two possible values.

Yet another embodiment of the present invention provides a display device that includes such an image scaling engine.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 2:
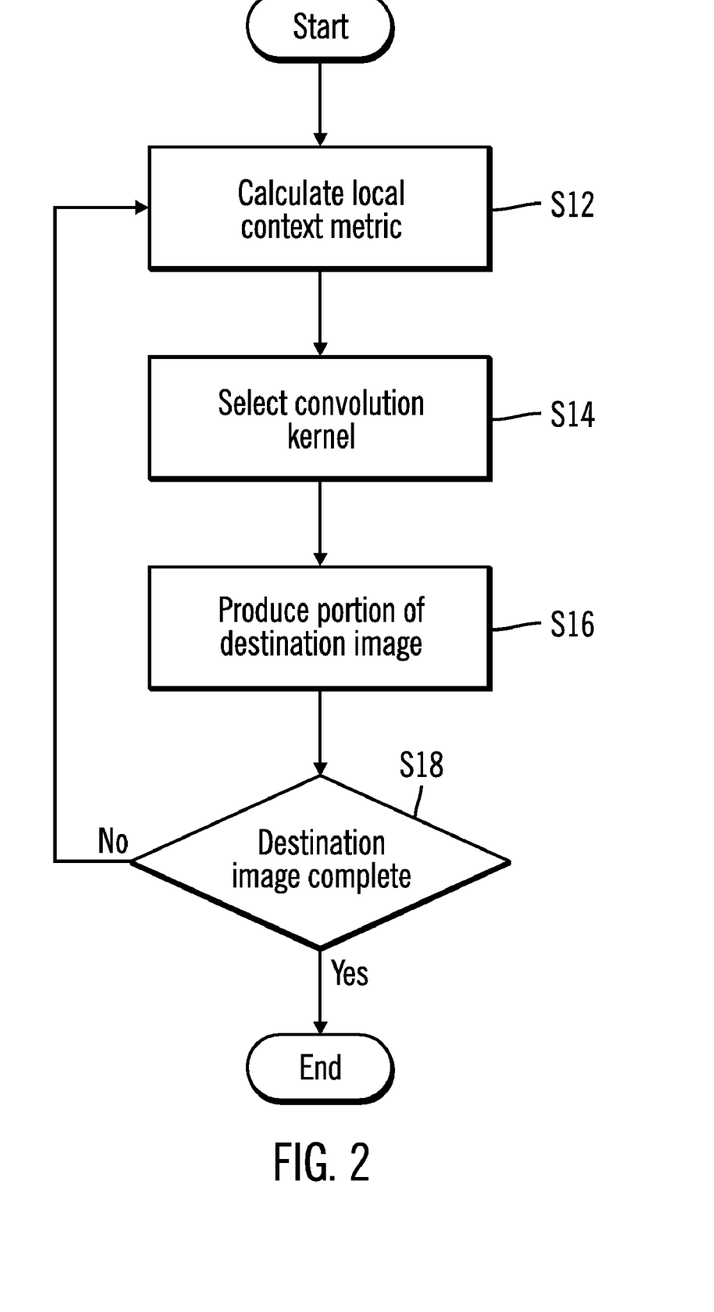
FIG. 2 is a flow chart of a method for scaling an image in accordance with a preferred embodiment of the present invention.

FIG. 2 is a flow chart of a method for scaling an image in accordance with a preferred embodiment of the present invention. First, a local portion of the source image is analyzed and a local context metric is calculated to determine the type of content in the vicinity (step S12). Next, based on the computed context metric, a convolution kernel (i.e., interpolation function) is selected from multiple available convolution kernels (step S14). The selected convolution kernel is then used to calculate the value of at least one pixel in the scaled destination image in the manner described above (step S16). These steps are repeated until the destination image is completed (step S18).

In the preferred embodiment, a local context metric is computed for each pixel of the destination image based on a grid of pixels in the relevant area of the source image. However, in further embodiments, local context metrics are computed on a less frequent basis and each selected convolution kernel is used to calculate multiple pixels of the destination image. Furthermore, the method of the present invention can be used with any relevant metric for determining the local image content and the convolution kernel of any interpolation function for determining destination pixel values. Preferably, the type of image being scaled is the basis for selecting a specific local context metric and the interpolation functions that are available. Table 1 lists some exemplary metrics and interpolation functions that are particularly suited for use in scaling various types of images.

TABLE 1

|  | Computer Video (e.g., static image data with text and graphics scaled by small ratios) | Consumer Video (e.g., motion video deinterlacing and scaling) |
| --- | --- | --- |
| Local Context Metrics | 1) contrast 2) degree of bimodal distribution of pixel colors | 1) frame-to-frame difference |
| Interpolation Functions | 1) smoothing (bilinear, B-spline, or gaussian) 2) sharpening (sinc or bicubic) | 1) intrafield ("bob") 2) interfield ("weave") |

Figure 3:
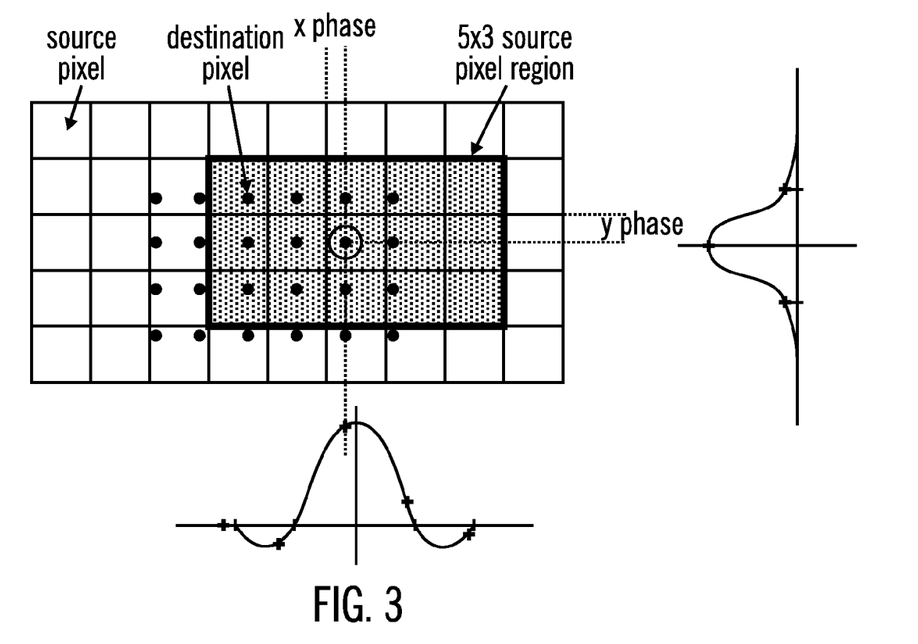
FIG. 3 shows a conventional implementation of interpolation functions in a two-dimensional scaling engine.

An embodiment of the present invention that is particularly suited for scaling computer video images containing both text and graphics will now be described in more detail. For comparison purposes, FIG. 3 shows a conventional implementation of interpolation functions in a two-dimensional linear scaling engine. As shown, a sharpening interpolation function is always applied in the horizontal dimension and a smoothing interpolation function is always applied in the vertical dimension. The scaling engine applies these functions over a 5×3 array of source image pixels to generate each pixel of the destination image.

In accordance with the present invention, a higher quality scaled image is produced by sharpening the text and smoothing the graphics. Therefore, the scaling engine is provided with a gaussian convolution kernel for smoothing and a cubic convolution kernel for sharpening. To determine whether the local content is text or graphics, a local contrast metric is used. More specifically, computer video text tends to be high contrast. Therefore, the local context metric is determined for each pixel of the destination image by calculating the difference between the maximum and minimum pixel values (i.e., contrast) over a 3×3 grid in the relevant area of the source image.

Alternatively, the local context metric can be determined by calculating the degree to which the pixels in the local area are clustered into two groups (e.g., using a local area histogram of pixels values) because computer video text tends to be bi-level. Next, based on the calculated value of the local context metric, either the gaussian kernel or the cubic kernel is used to generate a value for the selected pixel in the destination image. Thus, the destination image pixels are generated by selectively sharpening or smoothing the source image in a local area depending on the local content. The resulting destination image has better overall quality than an image generated using a single convolution kernel for the entire image.

In preferred embodiments, the local context metric has more than two possible values in order to reduce noise. With a binary metric (i.e., a metric having only two possible values), whenever the source image is close to the text/graphics threshold, a small amount of noise in the source image can cause the metric to flip from one value to the other. Because the change between smoothing and sharpening kernels is often dramatic, a binary metric has the effect of amplifying noise. To avoid this phenomena, a multi-bit metric is used in preferred embodiments to select one of several convolution kernels.

Figure 4:
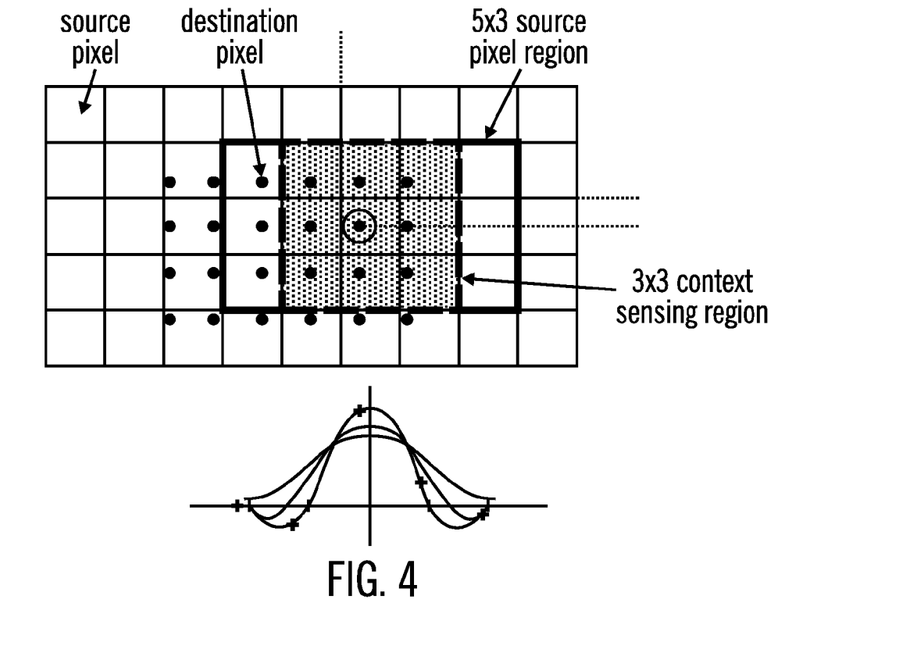
FIG. 4 shows an exemplary implementation of interpolation functions in a content-sensitive scaling engine.

FIG. 4 shows an exemplary implementation of interpolation functions in the content-sensitive scaling engine of the present invention. The available kernels include the kernels for sharpening and smoothing interpolation functions and a number of kernels that provide a smooth transition between the complete sharpening and complete smoothing functions, with the step size being small enough to avoid the perception of noise due to small variations in the source image. In one preferred embodiment, the local context metric contains four bits to define 16 context levels and one of 16 convolution kernels is selected based on the calculated value of the metric.

Figure 5:
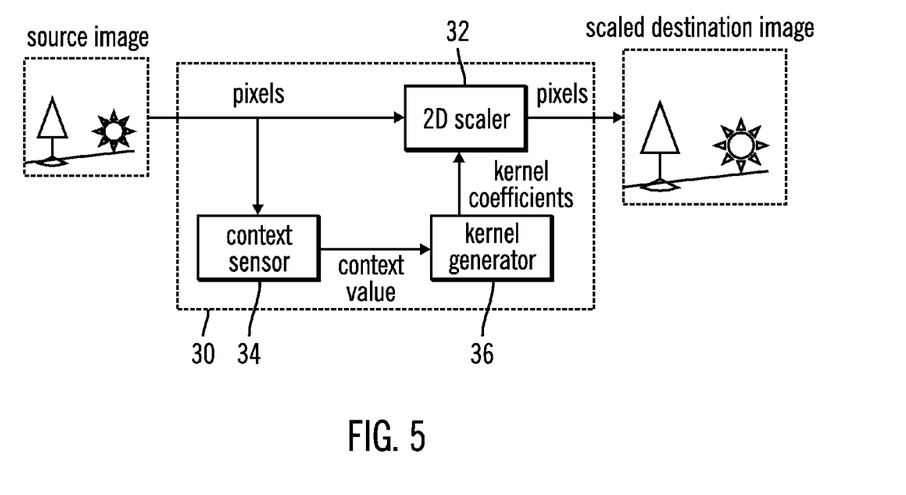
FIG. 5 is a block diagram showing one embodiment of an image scaling device according to the present invention.

FIG. 5 shows an image scaling device according to one embodiment of the present invention. As shown, the scaling engine 30 receives the pixels of a source image. A context sensor 34 uses the source image pixels to calculate a local context metric that is supplied to a kernel generator 36. The kernel generator 36 stores multiple convolution kernels in a memory and selects one of the kernels based on the value of the metric received from the context sensor 34. Alternatively, the kernel generator 36 can generate a convolution kernel by interpolating two or more convolution kernels based on the value of the metric. The coefficients of the selected convolution kernel are supplied to a two-dimensional scaler 32, which uses the received coefficients to generate a pixel of the destination image from the pixels of the source image in a conventional manner. The pixels of the scaled destination image are output from the scaling engine 30.

Typically, the scaling engine includes line buffers for storing the number of lines of received pixels that are required to compute the context metric and the destination image pixel values. Further, in one exemplary embodiment, the scaling engine is included in an LCD display device. The source image pixels are received from a computer or graphics engine, and the scaled destination image pixels are supplied to the LCD display. The content-sensitive scaling engine allows the device to display high quality scaled images from a source image containing mixed content.

The attached Appendix lists the pseudocode for the content-sensitive image scaling algorithm used in an exemplary embodiment of the present invention. A brief explanation of this algorithm will now be given. The scaling engine includes 5 lines of 1280×24 bit single port SRAM to allow the input port to write one line of memory at the same time as the output port is reading three lines of memory. The separable filtering interpolation function of the scaler implements a 3 tap vertical filter and a 5 tap horizontal filter.

The filter (i.e., convolution kernel) coefficients are stored in two 256 entry SRAMs. The y filter RAM is 3×6 (18) bits wide and the x filter RAM is 5×6 (30) bits wide. The addresses of these RAMs are composed of a phase component and a context component. The upper 4 bits of the address are the context and the lower 4 bits are the phase. During operation, y filtering is performed first, and then X filtering. The 5×3 (H×V) kernel is the outer product of the 1×3 vertical function and the 5×1 horizontal function. The filter coefficients are 6 bit two's complement with 5 fractional bits. The minimum value is −32/32, and the maximum value is +31/32. In order to implement a coefficient of 1.0 (which many filters require), the y and x filter tap coefficients are inverted. A convolution kernel with a smaller spatial extent can be implemented by setting the extra coefficients to zero. Thus, through the proper setting of the coefficients, this filter can implement many interpolation functions including nearest neighbor, bilinear, cubic, B-spline, and sinc.

The y phase and x phase generation algorithms are given in the Appendix. Briefly, the y phase generation algorithm is based on line drawing. An accumulator maintains a running sum, and each new output line triggers the input vertical pixel resolution to be added to this running sum. The scaling engine requests a new line from the line buffers when the running sum exceeds the vertical destination resolution. The residual amount represents the phase of the required scale function. Sixteen such phases are stored in the SRAM and a four bit accurate look-up table (LUT) division is performed to generate this result. The x phase generation algorithm operates in an analogous manner.

The context sensor measures the range of each color channel over a 3×3 local area and reports the sum of the ranges. As shown in the Appendix, the context sensor is applied to the y dimension first, independent of the local x dimension content of the image, in order to reduce hardware costs. The context circuit is then applied to the x dimension by operating on the output from the y dimension, which is an 11 bit two's complement representation. The filter performs the dot product of the three lines of data and a y kernel vector followed by a dot product of the intermediate results with an x kernel vector.

The content-sensitive image scaling method of the present invention can be implemented in hardware, software, or a combination of the two. For example, at least a portion of the method can be embodied in software programs that are stored in a computer-readable medium (e.g., non-volatile memory) for execution by a processing core. Further, while the embodiments described above relate to certain types of images, the image scaling method of the present invention can be applied to any type of image data from any source. Similarly, any local context metric can be used to determine the local image content, and any interpolation function can be used in generating the destination image. Other design choices, such as the size of the convolution kernel, the size of the context sensing grid, and the number of context levels, could also be easily adapted. Additionally, embodiments of the present invention may not include all of the features described above. For example, a multi-bit local context metric may not be used in all embodiments.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

APPENDIX

Algorithm Pseudocode

```
GENERAL FUNCTIONS
    clip(x,min,max)
        x < min : return (min)
        x > max : return (max)
        otherwise : return (x)
    overflow (x,min,max)
        generates an error flag if x < min or x > max
    rs (x,n)
        returns x right-shifted by n positions
Y PHASE GENERATION
    at beginning of frame
    {
        resid = dest_vpix / 2              // start at middle of first pixel
        at new output (destination) line
        {
            if (resid >= dest_vpix)
            {
                if (resid < 2*dest_vpix)    // single step
                {
                    resid -= dest_vpix
                    index one line ahead in the line buffer
                }
                else                        // double step
                {
                    resid -= 2*dest_vpix
                    index two lines ahead in the line buffer
                }
            // phase resid / dest_vpix
            // kill off leading zeroes of dest_pix to create denominator
            // between 16 and 31 and numerator between 0 and 31
            casex(dest_pix[11:4])
                8'b1xxxxxxx:
                    begin numer=resid_q[11:7]; denom=dest_pix[11:7]; end
                8'b01xxxxxx:
                    begin numer=resid_q[10:6]; denom=dest_pix[10:6]; end
                8'b001xxxxx:
                    begin numer=resid_q[9:5]; denom=dest_pix[9:5]; end
                8'b0001xxxx:
                    begin numer=resid_q[8:4]; denom=dest_pix[8:4]; end
                8'b00001xxx:
                    begin numer=resid_q[7:3]; denom=dest_pix[7:3]; end
                8'b000001xx:
                    begin numer=resid_q[6:2]; denom=dest_pix[6:2]; end
                8'b0000001x:
                    begin numer=resid_q[5:1]; denom=dest_pix[5:1]; end
                8'b00000001:
                    begin numer=resid_q[4:0]; denom=dest_pix[4:0]; end
            endcase
            phase = floor (numer/denom)
            resid += src_vpix
            overflow(resid,0,4095)
            }
        }
    }
X PHASE GENERATION
    at beginning of line
    {
        resid = dest_hpix / 2              // start in middle of pixel
        at new output (destination) pixel  // every dclk
        {
            if (resid >= dest_hpix)
            {
                if (resid < 2*dest_hpix)    // single step
                {
                    resid -= dest_hpix
                    index one pixel ahead in the scale_reg FIFO
                }
                else                        // double step
                {
                    resid -= 2*dest_hpix
                    index two pixels ahead in the scale_reg FIFO
                }
            // phase resid / dest_hpix
            // kill off leading zeroes of dest_pix to create denominator
            // between 16 and 31 and numerator between 0 and denominator-1
            casex(dest_pix[11:4])
                8'b1xxxxxxx:
                    begin numer=resid_q[11:7]; denom=dest_pix[11:7]; end
```

APPENDIX-continued

Algorithm Pseudocode

```
                    8'b01xxxxxx:
                        begin numer=resid_q[10:6]; denom=dest_pix[10:6]; end
                    8'b001xxxxx:
                        begin numer=resid_q[9:5]; denom=dest_pix[9:5]; end
                    8'b0001xxxx:
                        begin numer=resid_q[8:4]; denom=dest_pix[8:4]; end
                    8'b00001xxx:
                        begin numer=resid_q[7:3]; denom=dest_pix[7:3]; end
                    8'b000001xx:
                        begin numer=resid_q[6:2]; denom=dest_pix[6:2]; end
                    8'b0000001x:
                        begin numer=resid_q[5:1]; denom=dest_pix[5:1]; end
                    8'b00000001:
                        begin numer=resid_q[4:0]; denom=dest_pix[4:0]; end
                    default:
                        begin numer=resid_q[4:0]; denom=dest_pix[4:0]; end
                endcase
                phase = floor (numer/denom)
                resid += src_hpix
                overflow(resid,0,4095)
            }
    }
CONTEXT SENSOR
    For the y dimension
        // R0,R1,R2 = red channel (of 3 input lines, 8b unsigned data)
        // G0,G1,G2 = green channel
        // B0,B1,B2 = blue channel
        y_max_r = max(rs(R0,2),rs(R1,2),rs(R2,2))
        y_min_r = min(rs(R0,2),rs(R1,2),rs(R2,2))
        y_delta_r = y_max_r - y_min_r
        // same for y_delta_g, y_delta_b
        y_delta = y_delta_r + y_delta_g + y_delta_b
        if (y_delta < 64)
        {
            y_context = rs(y_delta,2)
        }
        else
        {
            y_context = 15
        }
    For the x dimension
        // R0,R1,R2=red channel intermediate filter results (11b 2's comp)
        // G0,G1,G2=green channel intermediate filter results
        // B0,B1,B2=blue channel intermediate filter results
        x_max_r = max(rs(R0,5),rs(R1,5),rs(R2,5))
        x_min_r = min(rs(R0,5),rs(R1,5),rs(R2,5))
        x_delta_r = x_max_r - x_min_r
        // same for x_delta_g, x_delta_b
        x_delta = x_delta_r + x_delta_g + x_delta_b
        if(x_delta < 16)
        {
            x_context = x_delta
        }
        else
        {
            x_context = 15
        }
FILTER
    // variables
        y_kernel[256] [3] = array of 6b filter coefficients
        x_kernel[256] [5] = array of 6b filter coefficients
        in = 8b unsigned input data
    temp = 0;
    for (x=0;x<5;x++)
    {
        y_inter = 0;
        for (y=0;y<3;y++)
        {
            y_product = in * ykernel[y_context*16 +y_phase] [y];
            y_inter += rs(y_product,4);
        }
        x_product = y_inter * x_kernel[x_context*16 + x_phase] [y];
        x_inter = rs(x_product,5);
        overflow(x_inter,-1024,1023);         // not all MSBs are carried here
        temp += x_inter;
        overflow(temp,-1024,1023);            // not all MSBs are carried here
    }
```

| APPENDIX-continued | |
|---|---|
| Algorithm Pseudocode | |
| overflow(temp,1024,1023);<br>out = clip(rs(temp,1),0,255); | // not all MSBs are carried here |

What is claimed is:

1. A method for scaling a source image to produce a scaled destination image, said method comprising the steps of:
    calculating a local context metric from a local portion of the source image;
    generating a convolution kernel from a plurality of available convolution kernels based on the calculated local context metric;
    using the generated convolution kernel to generate at least one pixel of the scaled destination image, the scaled destination image having a different resolution than the source image; and
    storing at least two convolution kernels in a memory,
    wherein in the generating step, either one of the stored convolution kernels is selected or another convolution kernel is generated by interpolating the stored convolution kernels.

2. The method as defined in claim 1, further comprising the step of repeating the calculating, generating, and using steps for each pixel in the scaled destination image.

3. A method for scaling a source image to produce a scaled destination image, said method comprising the steps of:
    calculating a local context metric from a local portion of the source image;
    generating a convolution kernel from a plurality of available convolution kernels based on the calculated local context metric; and
    using the generated convolution kernel to generate at least one pixel of the scaled destination image, the scaled destination image having a different resolution than the source image,
    wherein the available convolution kernels include at least one smoothing kernel and at least one sharpening kernel.

4. The method as defined in claim 3, further comprising the step of:
    storing all available convolution kernels in a memory,
    wherein in the generating step, one of the stored convolution kernels is selected based on the calculated local context metric.

5. The method as defined in claim 3, wherein the local context metric has more than two possible values.

6. The method as defined in claim 5, wherein the available convolution kernels include a complete smoothing kernel, a complete sharpening kernel, and a plurality of other kernels that provide a transition between the complete sharpening kernel and the complete smoothing kernel.

7. A machine-readable medium encoded with a program for scaling a source image to produce a scaled destination image, said program containing instructions for performing the steps of:
    calculating a local context metric from a local portion of the source image;
    generating a convolution kernel from a plurality of available convolution kernels based on the calculated local context metric; and
    using the generated convolution kernel to generate at least one pixel of the scaled destination image, the scaled destination image having a different resolution than the source image,
    wherein the available convolution kernels include at least one smoothing kernel and at least one sharpening kernel.

8. The machine-readable medium as defined in claim 7, wherein said program further contains instructions for performing the step of repeating the calculating, generating, and using steps for each pixel in the destination image.

9. The machine-readable medium as defined in claim 7, wherein said program further contains instructions for performing the step of:
    storing all available convolution kernels in a memory,
    wherein in the generating step, one of the stored convolution kernels is selected based on the calculated local context metric.

10. The machine-readable medium as defined in claim 7, wherein said program further contains instructions for performing the step of:
    storing at least two convolution kernels in a memory,
    wherein in the generating step, either one of the stored convolution kernels is selected or another convolution kernel is generated by interpolating the stored convolution kernels.

11. The machine-readable medium as defined in claim 7, wherein the local context metric has more than two possible values.

12. The machine-readable medium as defined in claim 11, wherein the available convolution kernels include a complete smoothing kernel, a complete sharpening kernel, and a plurality of other kernels that provide a transition between the complete sharpening kernel and the complete smoothing kernel.

13. An image scaling device that receives pixels of a source image and outputs pixels of a scaled destination image, said image scaling device comprising:
    a context sensor for calculating a local context metric based on local source image pixels;
    a kernel generator coupled to the context sensor, the kernel generator generating a current convolution kernel from a plurality of available convolution kernels based on the local context metric calculated by the context sensor; and
    a scaler coupled to the kernel generator, the scaler receiving the coefficients of the current convolution kernel from the kernel generator, and using the coefficients to generate at least one pixel of the scaled destination image from pixels of the source image, the scaled destination image having a different resolution than the source image,
    wherein the available convolution kernels include at least one smoothing kernel and at least one sharpening kernel.

14. The image scaling device as defined in claim 13, wherein the context sensor calculates a local context metric for each pixel in the destination image.

15. The image scaling device as defined in claim 13,
wherein the kernel generator stores at least two convolution kernels, and
the kernel generator generates the current convolution kernel by either selecting one of the stored convolution kernels or generating another convolution kernel by interpolating the stored convolution kernels.

16. The image scaling device as defined in claim 13, wherein the local context metric has more than two possible values.

17. The image scaling device as defined in claim 16, wherein the available convolution kernels include a complete smoothing kernel, a complete sharpening kernel, and a plurality of other kernels that provide a transition between the complete sharpening kernel and the complete smoothing kernel.

18. An image scaling device that receives pixels of a source image and outputs pixels of a scaled destination image, said image scaling device comprising:
a context sensor for calculating a local context metric based on local source image pixels;
a kernel generator coupled to the context sensor, the kernel generator generating a current convolution kernel from a plurality of available convolution kernels based on the local context metric calculated by the context sensor; and
a scaler coupled to the kernel generator, the scaler receiving the coefficients of the current convolution kernel from the kernel generator, and using the coefficients to generate at least one pixel of the scaled destination image from pixels of the source image, the scaled destination image having a different resolution than the source image,
wherein the available convolution kernels include at least one smoothing kernel and at least one sharpening kernel,
the kernel generator stores all available convolution kernels, and
the kernel generator selects one of the stored convolution kernels as the current convolution kernel based on the calculated local context metric.

19. A display device that receives source image pixels and displays a scaled destination image, said display device comprising:
a context sensor for calculating a local context metric based on local source image pixels;
a kernel generator coupled to the context sensor, the kernel generator generating a current convolution kernel from a plurality of available convolution kernels based on the local context metric calculated by the context sensor;
a scaler coupled to the kernel generator, the scaler receiving the coefficients of the current convolution kernel from the kernel generator, the scaler using the coefficients to generate at least one pixel of the scaled destination image from pixels of the source image, the scaled destination image having a different resolution than the source image; and
a display for displaying the scaled destination image,
wherein the available convolution kernels include at least one smoothing kernel and at least one sharpening kernel.

20. The display device as defined in claim 19, wherein the context sensor calculates a local context metric for each pixel in the destination image.

21. The display device as defined in claim 19,
wherein the kernel generator stores all available convolution kernels, and
the kernel generator selects one of the stored convolution kernels as the current convolution kernel based on the calculated local context metric.

22. The display device as defined in claim 19,
wherein the kernel generator stores at least two convolution kernels, and
the kernel generator generates the current convolution kernel by either selecting one of the stored convolution kernels or generating another convolution kernel by interpolating the stored convolution kernels.

23. The display device as defined in claim 19, wherein the display is an LCD display.

24. The display device as defined in claim 19, wherein the available convolution kernels include a complete smoothing kernel, a complete sharpening kernel, and a plurality of other kernels that provide a transition between the complete sharpening kernel and the complete smoothing kernel.

* * * * *